US012785000B2

(12) United States Patent
Gerig

(10) Patent No.: US 12,785,000 B2

(45) Date of Patent: Nov. 3, 2026

(54) SNAP-ACTION SWITCH ELEMENT WITH OPENER OR CLOSER CONTACT

(71) Applicant: EAO Holding AG, Olten (CH)

(72) Inventor: Roland Gerig, Aarau (CH)

(73) Assignee: EAO AG, Olten (CH)

( * ) Notice: Subject to any disclaimer, the term of this patent is extended or adjusted under 35 U.S.C. 154(b) by 336 days.

(21) Appl. No.: 18/692,086

(22) PCT Filed: Sep. 12, 2022

(86) PCT No.: PCT/EP2022/075268

§ 371 (c)(1),
(2) Date: Mar. 14, 2024

(87) PCT Pub. No.: WO2023/041481

PCT Pub. Date: Mar. 23, 2023

(65) Prior Publication Data

US 2024/0321528 A1 Sep. 26, 2024

(30) Foreign Application Priority Data

Sep. 15, 2021 (CH) .......................... CH0702732021

(51) Int. Cl.

| | |
|---|---|
| ***H01H 5/06*** | (2006.01) |
| ***H01H 23/04*** | (2006.01) |
| ***H01H 23/16*** | (2006.01) |

(52) U.S. Cl.

CPC .............. *H01H 5/06* (2013.01); *H01H 23/04* (2013.01); *H01H 23/16* (2013.01)

(58) Field of Classification Search

CPC .......... H01H 13/26; H01H 13/28; H01H 5/00; H01H 5/08; H01H 1/36; H01H 13/12; H01H 13/18; H01H 13/30; H01H 3/16; H01H 13/10; H01H 5/06; H01H 3/00; H01H 13/36; H01H 13/20; H01H 13/14;

(Continued)

(56) References Cited

U.S. PATENT DOCUMENTS 2,509,194 A 5/1950 Thorsheim
3,610,920 A * 10/1971 Frielinghaus ......... B61L 29/286
246/122 R (Continued)

FOREIGN PATENT DOCUMENTS

CN 207542118 U 6/2018
DE 4303589 A1 9/1994

(Continued)

*Primary Examiner* — Ahmed M Saeed

(74) *Attorney, Agent, or Firm* — The Webb Law Firm

(57) ABSTRACT

A snap-action switching element with normally closed contact includes a contact arm movable between a rest position and a switching position, and an actuating member with which the contact arm can be moved between these positions. A rocker switch is arranged at one end so as to be rotatable and a tension spring is suspended at the other end of the rocker switch on a spring suspension section. The actuating member has a rocker bearing opening which is provided transversely to its direction of movement and into which engages a rocker bearing actuating section provided transversely to a main plane of the switching rocker. In the case of a normally open contact, the first contact point is then arranged at a distance.

14 Claims, 7 Drawing Sheets

(58) Field of Classification Search
CPC ........ H01H 13/52; H01H 13/70; H01H 23/12; H01H 21/40; H01H 13/42; H01H 1/40; H01H 13/22; H01H 13/32
See application file for complete search history.

(56) References Cited

U.S. PATENT DOCUMENTS

| | | | | |
|---|---|---|---|---|
| 5,577,604 | A | 11/1996 | Dahmen et al. | |
| 5,684,280 | A | 11/1997 | Franz et al. | |
| 10,418,195 | B2 | 9/2019 | Wong | |
| 10,707,031 | B2 | 7/2020 | Da Mota Pais et al. | |
| 10,867,760 | B2 * | 12/2020 | Chen | H01H 13/30 |
| 2011/0147186 | A1 * | 6/2011 | Mori | H01H 13/18 200/468 |
| 2017/0372851 | A1 * | 12/2017 | Tsukanaka | H01H 1/36 |

FOREIGN PATENT DOCUMENTS

| | | | | | |
|---|---|---|---|---|---|
| DE | 4316068 | A1 | | 11/1994 | |
| DE | 102018100521 | A1 | | 12/2018 | |
| EP | 0399419 | B1 | * | 6/1996 | H01H 5/06 |
| EP | 0718859 | A1 | | 6/1996 | |
| EP | 3312861 | A1 | | 4/2018 | |
| JP | S60134245 | U | | 9/1985 | |
| JP | 200847317 | A | | 2/2008 | |
| JP | 4962614 | | * | 6/2012 | H01H 13/186 |
| WO | WO-2019230079 | A1 | * | 12/2019 | H01H 13/18 |

* cited by examiner

SNAP-ACTION SWITCH ELEMENT WITH OPENER OR CLOSER CONTACT

CROSS-REFERENCE TO RELATED APPLICATIONS

This application is the United States national phase of International Patent Application No. PCT/EP2022/075268 filed Sep. 12, 2022, and claims priority to Swiss Application No. CH070273/2021 filed Sep. 15, 2021, the disclosures of which are hereby incorporated by reference in their entireties.

BACKGROUND OF THE INVENTION

Field of the Invention

The present invention relates to a snap-action switching element described herein.

Description of Related Art

A number of snap-action switching elements are known from the prior art. DE 43 16 068 A1 uses a one-piece round wire as a snap-action switching element, which can be transferred from one switching position to the other switching position via an actuating element guided in the housing of the snap-action switch, whereby this switching position is held.

Another snap-action switching element is known from EP 3 312 861 A1, in which the actuating element engages in a spring with which a rocker switch is actuated. A return spring provided inside the actuating element returns the actuating element to its starting position.

DE 43 03 589 A1 discloses a cascaded snap-action switching element with normally closed or normally open contact with a bistable behavior with two spring-actuated rockers connected in series, whereby the first spring is pressed through as an actuating spring by pressing down the actuating element, whereby an actuating rocker is then pivoted, with which the second stage is then triggered.

JP2008047317A shows a snap-action switching element with the features described herein.

A similar system is known from the JPS60134245U, in which the plunger as actuating element presses directly on an L-shaped actuating rocker, which acts on a rocker switch via a spring and switches the movable contact between two fixed contacts.

CN207542118U discloses a microswitch with forced disconnection. A button triggers an elastic element and a movable contact piece. After the switch has reached the switching position, the release is forced, whereby a separating piece ensures the separation of the normally closed contact from the movable contact.

U.S. Pat. No. 2,509,194 A shows a changeover switch with a stop for the actuating rocker formed by a screw-in screw.

The snap-action switching elements of the state of the art have the disadvantage that the user does not have an optimum haptic switching experience. In most cases, annoying bouncing of the switch contact cannot be ruled out. An automatic, safe release of the switch back into the rest position once it has been brought into the switching position can usually only be reliably achieved using complex designs and additional elements.

SUMMARY OF THE INVENTION

Based on this state of the art, the invention is based on the task of providing an improved snap-action switching element with normally closed or normally open contact, which eliminates the disadvantages of the prior art.

A snap-action switching element with normally closed or normally open contact according to the invention comprises a housing, a first and a second contact point fixed to the housing, a contact arm movable between a rest position and a switching position, and an actuating member guided in the housing, with which the contact arm is movable between the rest position and the switching position. A rocker switch is arranged at one end so that it can be rotated about a rocker pivot axis extending transversely to the longitudinal axis of the housing, with a tension spring being hooked onto a spring hook-in section at the other free end of the rocker switch. The actuating member is guided perpendicular to the longitudinal axis of the housing and engages with the rocker switch between the two ends. The second contact point fixed to the housing represents a contact arm axis of rotation parallel to the rocker axis of rotation, against which one free end of the contact arm is pressed by the tension spring suspended in the contact arm, whereby the other end of the contact arm makes contact with the first contact point in the rest position in the case of a normally closed contact and is arranged at a distance from the first contact point in the rest position in the case of a normally open contact. The actuating member has a rocker bearing opening which is provided transversely to its direction of movement, in which a rocker bearing actuating section provided transversely to a main plane of the rocker switch engages, which allows a compact design of the rocker switch and actuating element next to each other in the housing. Side by side means that the pivoting movement of the rocker switch is achieved via an essentially horizontally aligned rocker bearing actuating section, the longitudinal axis of which is perpendicular to the main axis of the actuating element.

In a preferred embodiment, the rocker switch has a driver which, in the rest position, projects from below over the contact arm in such a way that, when the rocker switch is moved into its switching position, it engages with the contact arm from above before the switching position is reached, in particular at the switch actuating position, and swivels it downwards in an actively guided manner in the event that the contact arm does not move between the rest position of the actuating member and the engagement by adhesion of the contact point of the contact arm to the first contact point.

The length of the tension spring, the distance between the hook-in opening in the contact arm and the contact arm axis of rotation, and the distance between the spring hook-in section and the rocker axis of rotation are advantageously predetermined so that the torque acting on the rocker switch is always directed upwards in the rest position, in the switching position and in the positions in between of the actuating element, so that the actuating member moves back to the rest position without being actuated.

These above-mentioned features can be realized with a normally closed switching element as well as with a normally open switching element. In both cases, the linear movement of the actuating shaft is transmitted approximately centrally to the rocker switch between its ends. These are sometimes also referred to as free ends, even if they are mounted.

The function of the normally closed (NC) switching element in particular is ensured if the rocker switch has a driver. This driver can comprise at least one horn, preferably two horns to the left and right of the contact arm. A continuous bar or bridge can also be provided so that the contact arm protrudes through the passage formed by the bar. This contour then protrudes from below over the contact arm in the rest position in such a way that it can engage with the contact arm from above when the rocker switch is moved into the switching position before this switching position is reached, in particular already when or shortly after the switching position is reached, and can pivot it downwards in an actively guided manner if the contact arm does not move between the rest position of the actuating element and the engagement due to the contact point of the contact arm adhering to the first contact point. This ensures the switching in all cases and functionally means a forced disconnection.

The rocker bearing actuating section can therefore be a transversely arranged bolt which is inserted in a corresponding receptacle of the rocker switch. It can also be a rocker bearing actuating section integrally connected to the rocker switch, which engages with the actuating member via a rocker bearing opening, in particular through a substantially horizontally aligned slot with two opposing parallel central areas in the actuating member. The bolt can be cylindrical but can also be connected in one piece with either the rocker or the plunger or be in a form fit with them. There must be sufficient play in the complementary element to combine the vertical movement of the plunger with the pivoting movement of the rocker.

An upper rest position stop can then be provided between the rocker bearing actuating section and the spring catch section. And/or a support section for the contact arm can be provided between the rocker pivot axis and the rocker bearing actuating section, in particular against which the underside of the contact arm leans once the switching position has been exceeded, thereby preventing mechanical bouncing against the stop.

Starting from the free end with the contact arm's axis of rotation, the contact arm can have a rocker switch mounting opening and a separate spring end mounting opening adjoining it. Such a central articulation to the contact arm avoids undesirable lateral forces.

The contact arm can then advantageously have a U-shaped cross-section in the longitudinal direction, at least in the area of the rocker switch mounting opening and the spring end mounting opening, so that it is torsionally rigid and only rotates around the axle groove.

The rocker switch can have a receiving opening and a rocker bearing actuating section inserted into this receiving opening, with which the actuating member engages with the rocker switch between the two ends of the rocker switch.

The rocker switch can also have two transverse upper and lower mounting openings. In this case, the rocker switch actuating section is a bolt or cylinder inserted into one of the openings, for example the upper opening. This has particular advantages when a double switching element is provided, whereby as many components as possible should be standardized. In this case, the other, in this case lower, mounting opening optionally already has a partition in the middle. This design forms a laterally designed double switching element.

Such a double-jump switching element is based on a single-jump switching element in which the side wall of the housing has a substantially vertically aligned housing groove in the area of the lower mounting opening of the rocker switch in the side wall, so that a connecting shaft is inserted into the other, in this case lower, mounting opening. The aforementioned partition wall is then advantageous, as the connecting shaft cannot move transversely. Then a further pair of housing-fixed contact points, a further contact arm, a further rocker switch and a further tension spring are provided in a housing attachment, each of which is arranged in the direction of the longitudinal axis of the housing parallel to the first housing-fixed contact points, the first contact arm, the first rocker switch and the first tension spring behind the said side wall, the movement of the two rocker switches being synchronized by the connecting shaft. Only one actuating element is therefore required for the safe actuation of two separate switching circuits.

It can also be a single receiving opening and the connecting shaft can then either be integrated in one piece into the rocker bearing actuating section or the rocker bearing actuating section and connecting shaft are arranged one behind the other in the single receiving opening as seen from the side of the actuating member.

Further embodiments are given in the dependent claims.

BRIEF DESCRIPTION OF THE DRAWINGS

The terms Fig., Figs., Figure, and Figures are used interchangeably in the specification to refer to the corresponding figures in the drawings.

Preferred embodiments of the invention are described below with reference to the drawings, which are for explanatory purposes only and are not to be construed restrictively. The drawings show.

DESCRIPTION OF THE INVENTION

Figure 1:
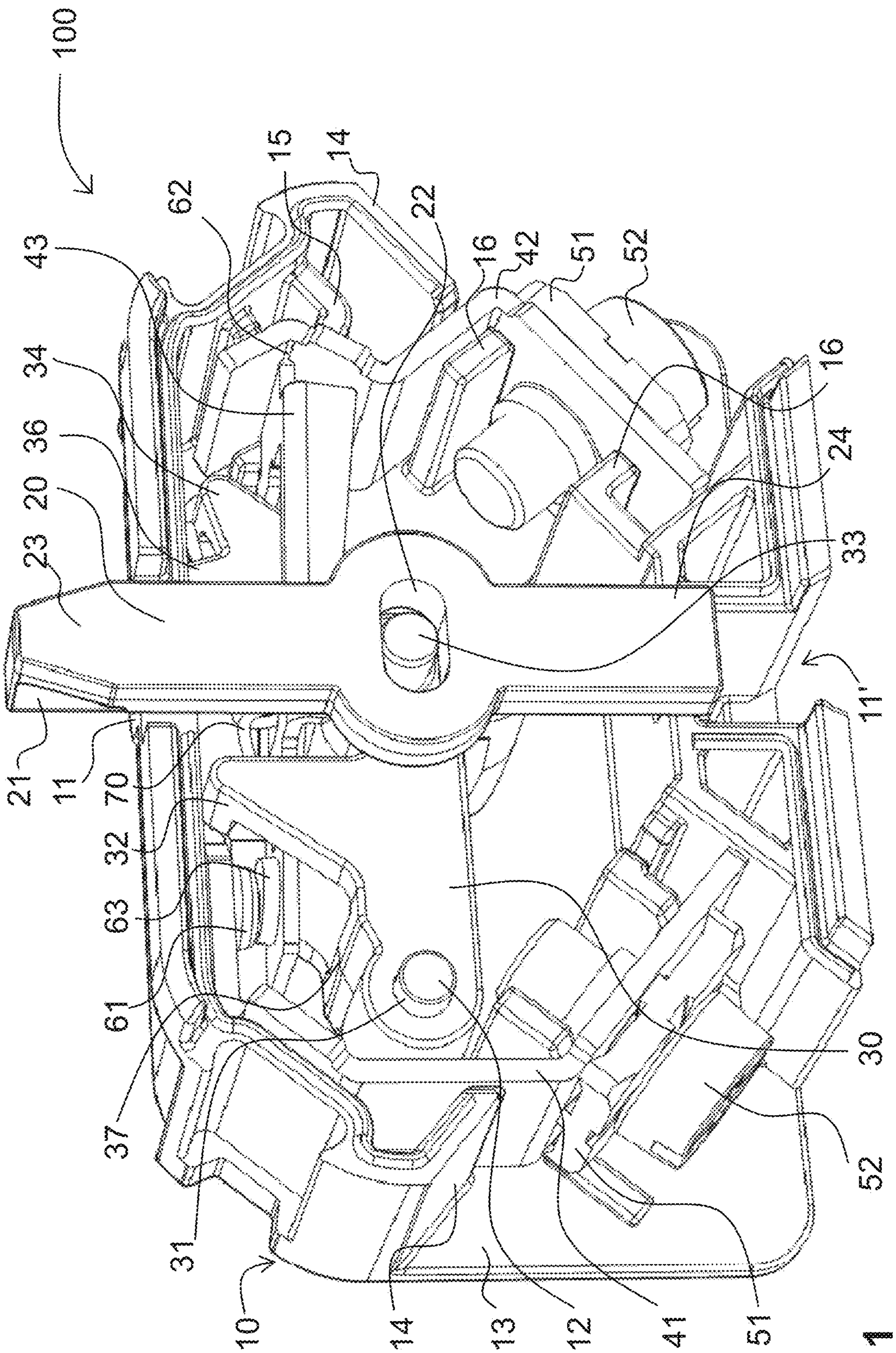
FIG. 1 a perspective view of a snap-action switching element with normally closed contact in the rest position according to a first embodiment example without the front side wall.
Figure 2:
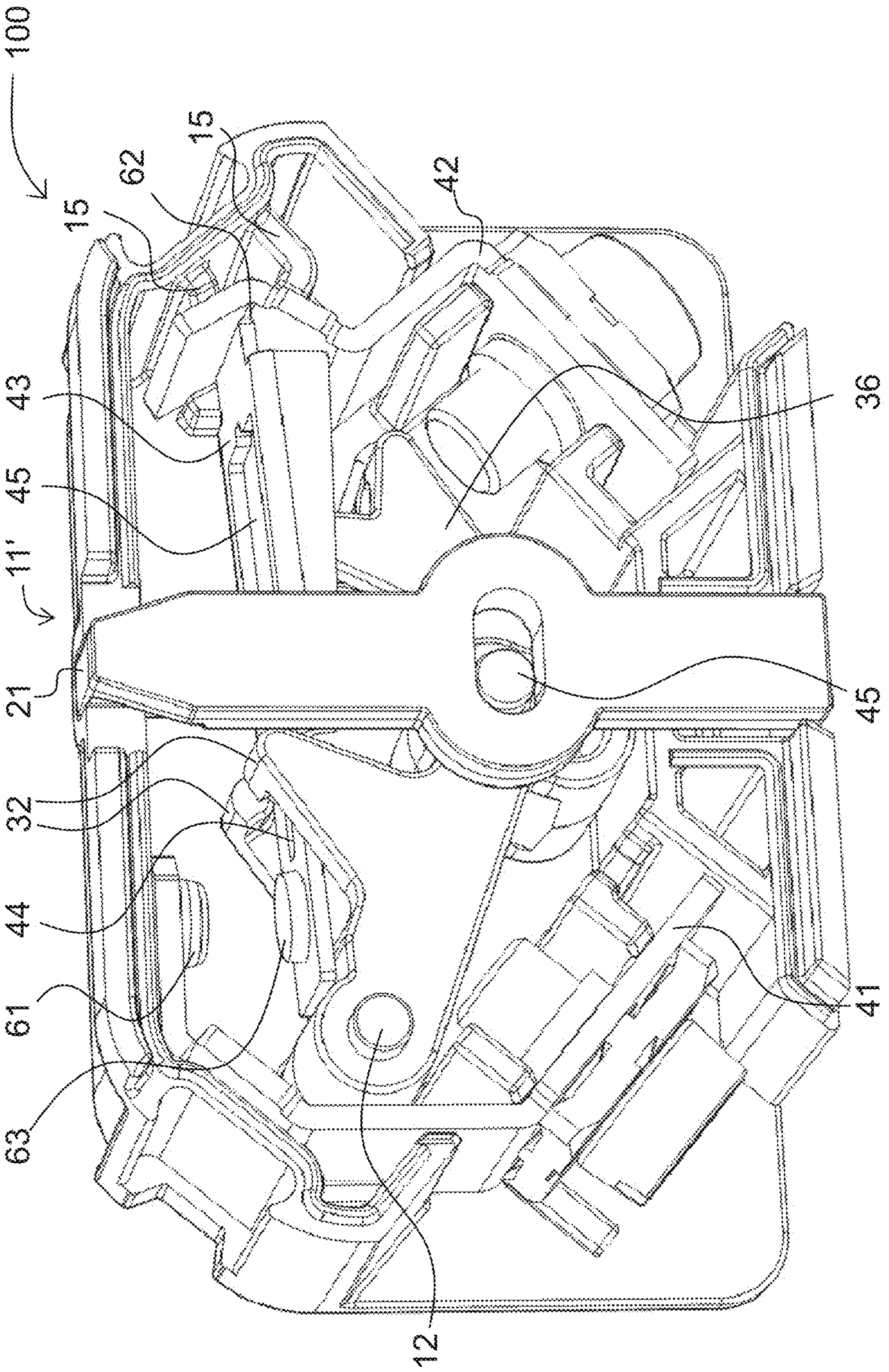
FIG. 2 a perspective view of the snap-action switching element according to FIG. 1 in the switched position.
Figure 3:
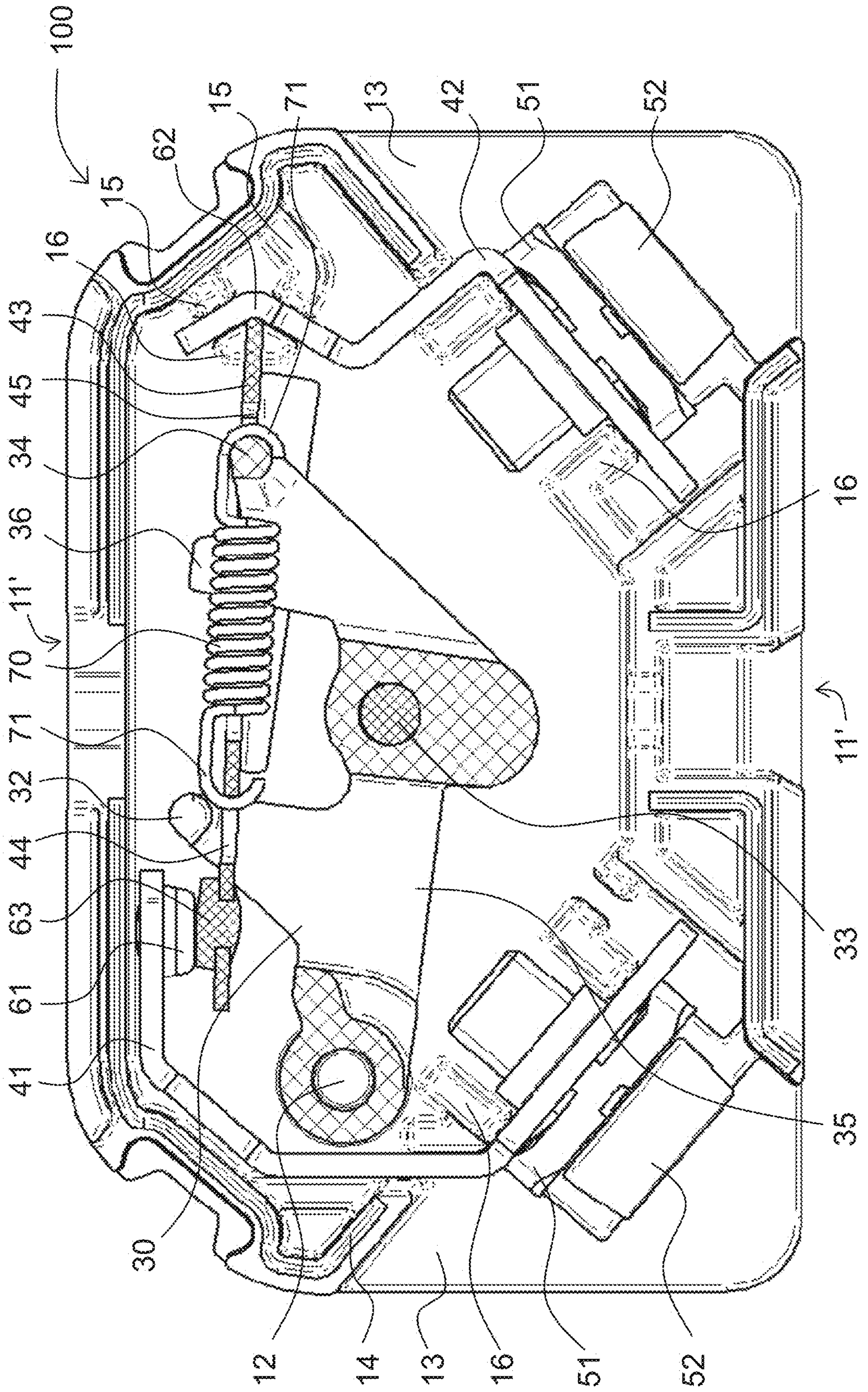
FIG. 3 a partially sectioned view of the snap-action switching element according to FIG. 1 at the switching point.

FIG. 1 shows a perspective view of a snap-action switching element with NC contact 100 (normally closed contact) in the rest position according to a first embodiment example without the front side wall of the housing 10. FIG. 2 then shows a perspective view of the snap-action switching element according to FIG. 1 in the switched position, while FIG. 3 shows a partially sectioned view of the snap-action switching element according to FIG. 1 and FIG. 2 in the switched position.

The housing 10 has an upper housing opening 11 at the top and another lower housing opening 11' at the bottom. The openings 11 and 11' are located one above the other and define an actuating axis along which the actuating member 20 can be moved as an actuating shaft in the longitudinal direction of this axis. The actuating shaft 20 has an upper head section 23 and a lower guided section 24 between which a rocker bearing opening 22 is located. The rocker bearing opening 22 is in particular an aperture in the form of a substantially horizontally aligned slot in the actuating member 20. The horizontal alignment of the slot takes account of the slight transverse pivoting movement of the rocker switch 30 during its movement. Instead of such an elongated hole, the rocker bearing opening 22 can also have a different shape that allows horizontal play for the movement of the rocker bearing actuating section 33. The rocker bearing opening 22 may have a vertical height to allow movement of the rocker bearing operating portion 33 toward the operating member 20 during the shifting operation. The upper head portion 23 has an actuating head that is T-shaped in plan view. The T-shaped flanks are widened and chamfered in the direction of the actuating axis. The housing 10 has guide ribs for the actuating element 20, which are not shown in FIG. 1. This also includes the T-shaped upper housing bushing 11 designed with play for the actuating head 21.

A first conductive contact 41 is arranged in the housing 10. The contact 41 is a multi-bent flat metal component, which essentially has a C-shape in the side view. One free end of the first contact 41 is accessible from outside the housing 10 and is protected between two housing side wall sections 13 in the embodiment shown in FIG. 1. A cable can be connected between the clamping plate 51 and the first contact 41 via a clamping plate 51, which is pressed onto the first contact 41 by a clamping screw 52. A contact 61 is provided at the other free end of the first contact 41 on the side facing away from the inner wall of the housing. The C-shaped contact 41 is held in the position shown in FIG. 1 by contact support ribs 15 and counter-ribs 16 in a positive or frictional connection.

A second conductive contact 42 is arranged in the longitudinal direction of the housing 10 on the opposite side of the actuating element 20. Here too, a free end of the second contact 42 can be connected to an external cable using clamping plate 51 and screw 52. The second conductive contact 42 is also inserted in the housing 10 near the inner wall of the housing in an approximate C-shape with contact support ribs 15 and counter-ribs 16. However, it has a bearing groove 62 in the upper area at its opposite second free end in the side view. The orientation of the bearing groove 62 is horizontal with respect to the vertically oriented actuating member 20. In other words, the bearing groove 62 is oriented transversely or transversely with respect to the longitudinal direction of the housing 10.

The switching connection between the first conductive contact 41 and the second conductive contact 42 is established with the mounted contact arm 43. Like the first-mentioned contacts 41 and 42, the contact arm 43 is a metal component which, however, has some further features. The end projecting into the bearing groove 62 can have a taper and in particular be rounded. Preferably, this end projecting into the bearing groove 62 is held laterally against transverse displacement by ribs 16 of the housing 10. Adjacent to the end of the contact arm 43 projecting into the bearing groove 62 is a rocker receiving opening 45, which is adjoined by a separate spring receiving opening 44. The contact point 63 of the mounted contact arm 43 is provided at the opposite free end, which can be designed in particular as a contact bead inserted into a further opening.

The length of the contact arm 43 in the housing is selected in such a way that the contact point 63 can be brought into conductive contact with the first contact point 61 when one free end engages in the bearing groove 62. In this rest position shown in FIG. 1, the contact arm 43 is arranged slightly inclined, with the area of the free end of the contact point 63 being arranged slightly higher than the free end of the bearing groove 62. This position is maintained until the switching position shown in FIG. 3.

When viewed in the longitudinal direction of the contact arm 43, it is advantageously U-shaped in the areas with the openings 44 and 45, for example having lateral wings in the original shape, which are then folded into this U-shape in order to reinforce the structure of the contact arm 43.

A transverse rocker switch bearing 12 is provided in the housing 10, which protrudes from the side wall and on which a rocker switch 30 is placed with its bearing opening 31. For short switching distances, the rocker bearing actuating section 33 on the rocker switch 30 is advantageously provided at approximately the same height as the rocker switch bearing 12. The rocker bearing actuating section 33 is a transversely aligned pin, in particular a cylindrical section, in short a cylindrical pin, which is inserted into the rocker bearing opening 22 of the actuating member 20.

This divides the rocker switch 30 into two sections, namely the bearing-side section 35 located between the rocker switch bearing 12 and the actuating section 33 and the spring-side section 36 located on the other side. Two laterally raised horns 32 are provided on the bearing-side section 35, which rise above the contact arm 43 to the left and right of the latter and, as can be seen in FIGS. 1 and 3, are positioned at a distance above the contact arm 43.

The spring-side section 36 has a spring-engaging section 34, in particular a short transverse shaft with a circumferential groove for receiving a spring end. The spring-side section 36 can also have a stop which, in the rest position, strikes against the inner wall of the housing 10 from below. The spring hook-in section 34 is narrow enough in the transverse direction to be able to pass through the rocker receiving opening 45; the aforementioned optional stop can, like the horns 32, be guided next to the contact arm 43 or also through the opening 45.

A tension spring 70 is suspended with its one free end on the spring suspension section 34 and with its other free end in the spring receiving opening 44 of the contact arm 43, so that with its spring force it pulls the contact arm 43 with its free end designed as a bearing into the bearing groove 62 and holds it in this groove. As can be seen in FIG. 1, the longitudinal axis of the spring 70 is aligned from bottom left to top right and thus exactly opposite to the alignment of the contact arm, which is aligned slightly downwards from top left to bottom right.

This description thus leads to the sequence of the switching operation, in which the actuating element 20 is pressed down in the rest position of FIG. 1. This moves the rocker bearing opening 22 downwards in the direction of the lower housing opening 11', which causes the rocker switch 30 to tilt about the axis of rotation determined by the rocker switch bearing 12. In the process, the rocker bearing actuating section 33 moves downwards and at the same time slightly in the longitudinal direction of the housing 10. The rocker switch 30 pulls down the suspension section 71 of the spring 70 with its spring engaging section 34, whereby the spring rotates around the inner edge of the spring receiving opening 44 until the position of FIG. 2 results, in which the longitudinal direction of the spring 70 coincides with the longitudinal direction of the contact arm 43.

When the actuating member 20 is pressed down further in the direction of the switching position according to FIG. 2, the spring catch section 34 moves further downwards and generates a torque around the bearing groove 62, so that the contact point 63 of the contact arm 43 disengages from the contact point 61 of the first contact 41 and the contact arm

43 becomes entangled around the bearing groove 62 and comes to rest with its underside on the contact surface 37 on the bearing rocker 30.

The stroke to be triggered by the actuating element 20 for this movement is less than 0.3 millimeters for standard sizes of the snap-action switching element 100. This application of force also prevents bouncing. If the contact points 61 and 63 have stuck together, the horns 32 come into contact with the contact arm 42 from above during the downward movement of the rocker switch 30 and pull it downwards in a forced separation, whereby any sticking together of the contact points 61 and 63 is reliably released.

In the end position shown in FIG. 3, the torque acting on the rocker switch 30 is still directed upwards, i.e. when the actuating member 20 is released, the rocker switch moves back into the initial position of the rest position according to FIG. 1. In the initial position of the rest position, the tension spring 70 exerts an upwardly directed torque in addition to the connection of the two mounted parts, rocker switch 30 and mounted contact arm 43, so that the switched rocker switch 30 abuts against the upper wall of the housing from below with the aforementioned section 36.

Figure 4:
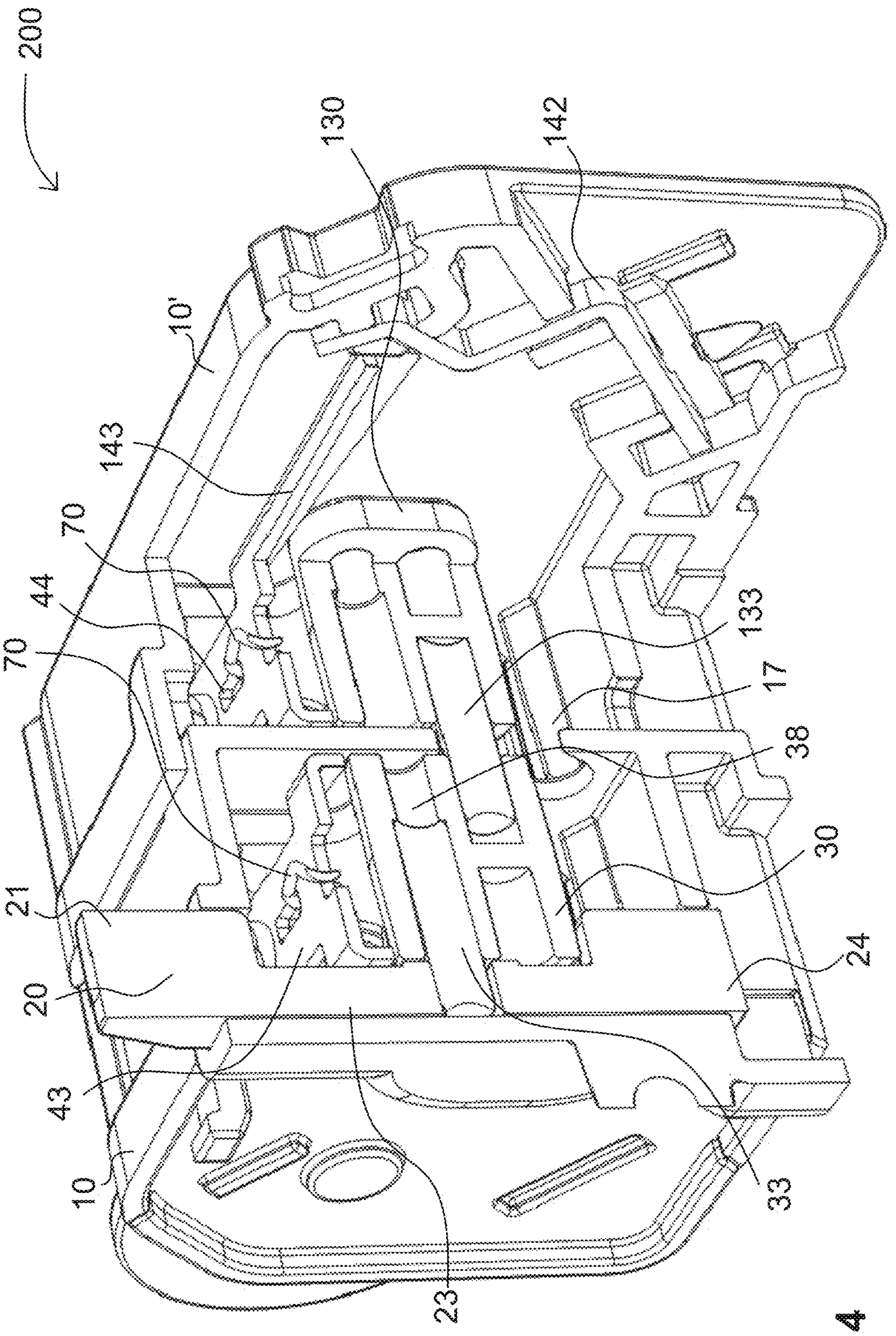
FIG. 4 a partial perspective view of a snap-action switching element according to a second embodiment example with coupled contacts.

FIG. 4 shows a partial perspective view of a further snap-action switching element 200 according to a second embodiment example with coupled contacts. This is also designed as a normally closed contact. However, analogous to FIG. 6, it can also be designed as a double normally open contact. In addition to the contacts 41, 42 and 43 from the first embodiment example, of which only a part of the contact arm 43 is shown here, there are corresponding contacts, of which only the contacts 142 and 143 are shown here in FIG. 4. However, it is clearly recognizable that in the embodiment example of the snap-action switching element 200, two identically constructed snap-action switching elements 100 are arranged next to each other, whereby the differences are now pointed out in the description here.

The housing half 10 shown on the left in FIG. 4 is constructed in the same way as the snap-action switching element 100 and has the actuating element 20. The housing half 10 is modified in that it has a housing groove 17 on the side facing away from the actuating element 20. In addition to the rocker bearing actuating section 33, which is located in an upper receiving opening 38, the rocker switch 30 also has a lower receiving opening 138, in which a connecting shaft 133 is inserted on the side facing away from the actuating element 20.

In the description of FIG. 1, it has been left open whether the rocker bearing actuating section 33 is formed integrally with the rocker switch or takes the form of a bolt, as here in the embodiment example of the snap-action switching element 200. To simplify the stocking of components, the rocker switch 30 can also have the double-storey receiving openings 38 and 138 in the case of the embodiment example of the snap-action switching element 100, although only the upper opening 38 is used.

The upper receiving opening 38 has a shoulder narrowing the inner diameter as a stop for the rocker bearing actuating section 33. This can also be replaced by a partition wall, as in the lower receiving opening 138, and conversely the partition wall can be replaced by corresponding oppositely aligned shoulders narrowing the inner diameter. In other embodiments, the arrangement of top and bottom can be reversed accordingly, so that the connecting shaft is inserted in an upper receiving opening 38 and the substantially vertically aligned housing groove 17 is correspondingly designed further up or simply larger. In the case of the embodiment example of the snap-action switching element 200, the connecting shaft 133 projects through the said housing groove 17 of the housing 10 into the lower receiving opening 138 of the rocker switch 130, which is constructed identically to the rocker switch 30. Advantageously, the lower receiving opening 138 is optionally divided into two blind holes by a centrally arranged wall, so that the inserted connecting shaft 133 cannot move transversely. In the case of the rocker switch 130, the upper receiving opening 38 remains empty, because the switching operation is carried out by the single actuating member 20 via the rocker bearing actuating section 33. The identical structure around the rocker switches 30 or 130 results in an identically mounted switching operation, since the springs 70 are suspended in an identical position between the contact arms 43 or 143 and the spring suspension sections 34 of the rocker switches 30 or 130, so that the contact arms 43, 143 are arranged in the bearing grooves 62 of the second contacts 42, 142.

Figure 5:
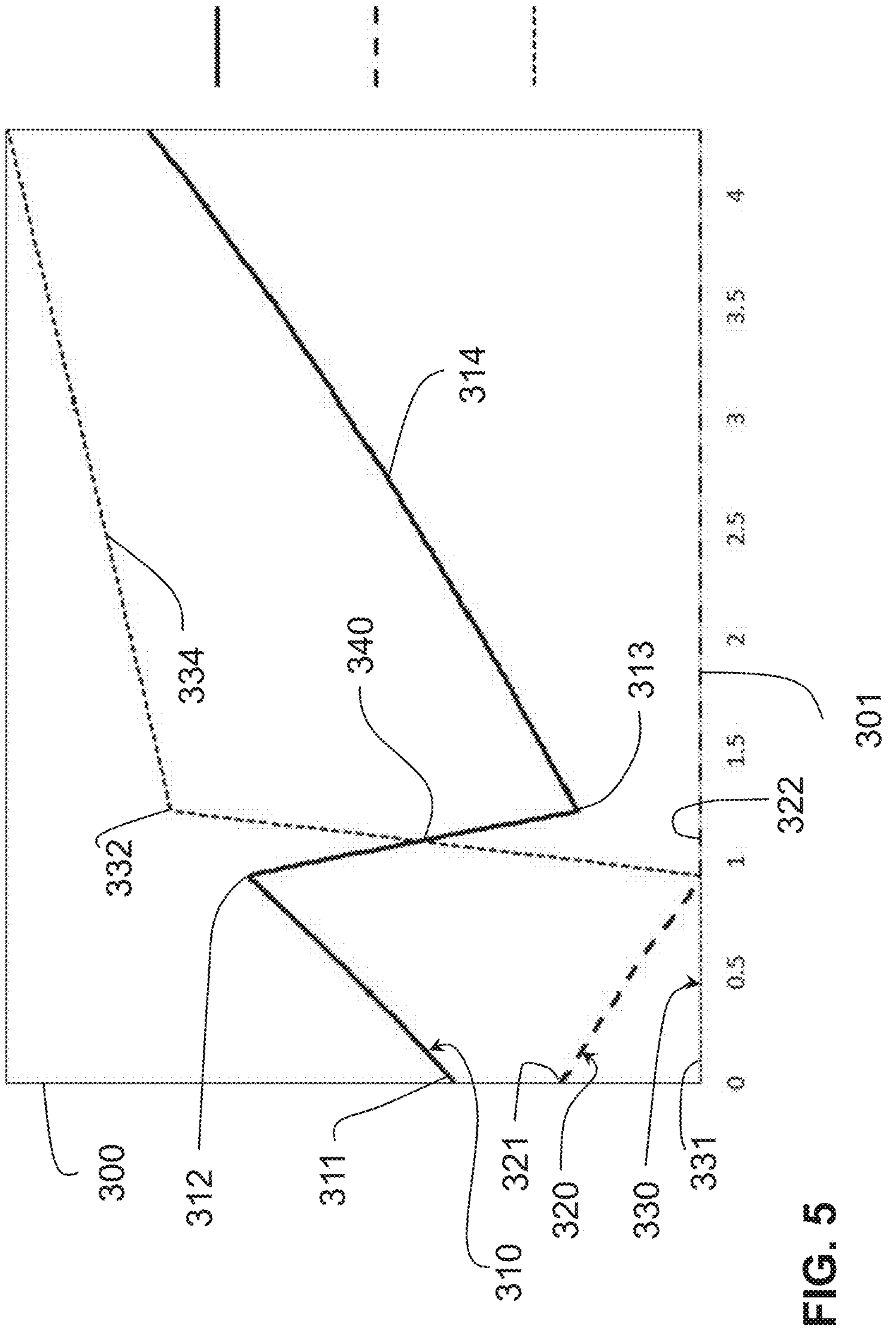
FIG. 5 a switching sequence force-displacement diagram for a snap-action switching element with NC-contact.

FIG. 5 shows a switching sequence force-displacement diagram for the snap-action switching element with normally closed contact, i.e. for a snap-action switching element 100 according to the embodiment shown in FIGS. 1 to 3. Since the mechanics are identical for the double snap-action switching element 200 with normally closed contact according to the embodiment example shown in FIG. 4, this diagram also applies to this embodiment. The same will arise in connection with the description of FIG. 6, which shows an embodiment example with a snap-action switching element with normally open contact 400. Here, the reference sign 301 denotes the X-axis, which represents the path of the actuating shaft 20 from the rest position, shown on the left at the origin, until it is fully depressed at the right end of the diagram. The reference sign 300 indicates the Y-axis, which represents the value of a force or a distance for each of the various curves.

The fully extended line 310 represents the force acting on the rocker switch 30, as it acts on the rocker switch 30, for example, at the spring catch section 34 or at the rocker bearing actuating section 33, i.e. the transversely inserted cylindrical pin. It should be noted that this force always acts in one direction, whereby the positive value shown here corresponds to a force in the direction of the rest position of the actuating shaft 20.

The roughly dashed curve 320 represents the progression of the force acting on the contact point 63 of the mounted contact arm 43.

The fine dashed curve 330 represents a path, namely the distance of the supported contact point 63 from the associated fixed contact point 61.

In the rest position of the actuating shaft 20, a holding force 311 acts on it and holds the actuating shaft 20 in this rest position. Parallel to this, an initial force 321 acts on the contact point 63 of the mounted contact arm 43 and holds it at the fixed contact point 61 assigned to it. This means that it is securely closed. Therefore, the distance 331 between contact point 63 of the supported contact arm 43 and the fixed contact point 61 assigned to it is zero (=0).

When the actuating shaft 20 is actuated, the force acting on the actuating shaft 20 in the opposite direction to its movement increases up to the relative peak value 312 at the start of the opening movement of the switching element. This point is characterized by reaching the value of the force 322 equal to zero (=0), i.e. when no more force acts on the contact point 63 of the mounted contact arm 43 and pulls it to the fixed contact point 61. From this point onwards, the distance between contact point 63 of the mounted contact arm 43 and the fixed contact point 61 assigned to it changes rapidly from zero to an opening value 332 when the rocker switch 30 switches; parallel to this, the force acting on the actuating shaft 20 in the opposite direction to its actuation decreases to a minimum value 313, which corresponds to the force at the end of the opening movement of the switching element.

When the actuating shaft 20 is pressed down further, the restoring force 314 acting on the rocker switch increases again monotonically. At the same time, the distance 334 of the contact point 63 continues to increase until the free end of the contact arm 43 eventually comes into contact with the contact surface 37.

Figure 6:
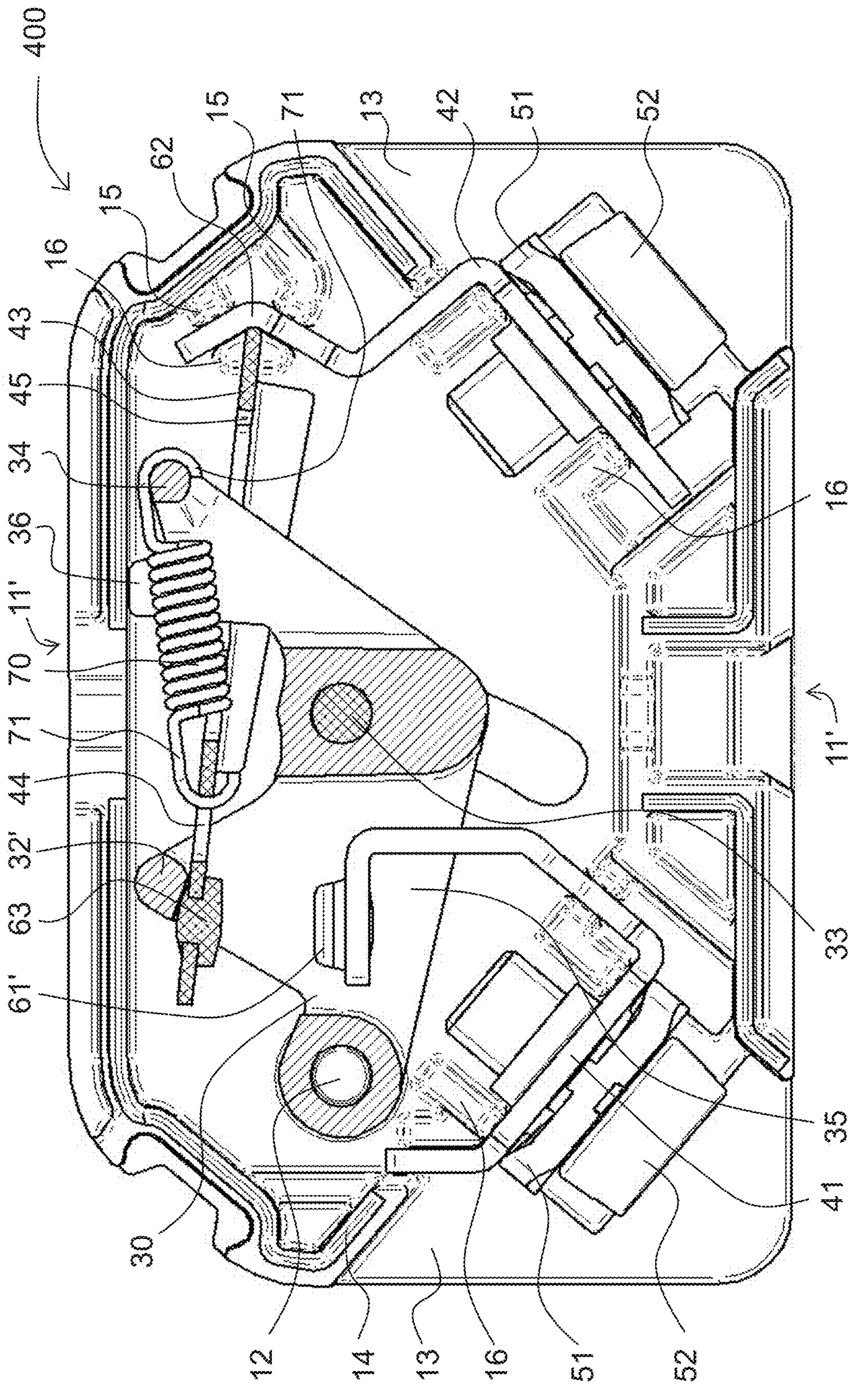
FIG. 6 a partially sectioned view of a snap-action switching element with normally open contact according to a third embodiment example without the front side wall and with otherwise the same features as in the first embodiment example according to FIG. 1.

FIG. 6 shows a partially sectioned view of a snap-action switching element with normally open contact 400 according to a third embodiment example without the front side wall and with otherwise the same features as in the first embodiment example of a snap-action switching element with normally closed contact according to FIG. 1. All the same features are provided with the same reference signs.

The snap-action switching element 400 is shown in the position in which the actuating shaft 20 (not shown) is in the rest position. However, it is shown indirectly in relation to its height position by the rocker bearing actuating section 33, since this cylindrical pin is arranged in the slotted hole 22 of the actuating shaft 20.

The kinematic reversal of the function between the embodiment examples shown in FIGS. 3 and 6 is directly apparent, even if FIG. 3 does not show the embodiment example of the switching element with normally closed contact 100 in the rest position of the actuating shaft 20. In FIG. 6, the rear of the mounted contact point 63 rests against the underside of the horn 32' of the rocker, if such a horn is provided. Otherwise, however, it can also abut against the underside of the housing. The horn 32' is an embodiment of a driver. This corresponds to the contact between the front of the mounted contact point 63 in FIG. 3 and the fixed contact point 61. When the actuating shaft 20 of the snap-action switching element 400 is pressed down, the force acting on this contact between the horn 32' and the mounted contact point 63 is reduced, as shown in FIG. 5, until the switching point is reached and the mounted contact arm 43 then folds over, pulling the mounted contact point 63 towards the fixed contact point 61', which leads to the second electrical contact being closed. The fixed contact point 61' of the switching element with normally open contact 400 is arranged in the free space below the horns 32' and can be seen in comparison with the design of the switching element with normally closed contact 100 of the contact surface 37. The difference between the curves of the switching diagram of FIG. 5 for the switching element with normally open contact 400 lies in the fact that the curve 330 of the distance from the supported contact point 63 to the fixed contact point 61' is essentially mirrored on a vertical straight line through or near the intersection point 340; in other words, the distance slowly decreases from an initial value (in particular, taken along by the horn 32') and then falls with a large gradient to zero, which corresponds to a closing of the contact.

Figure 7:
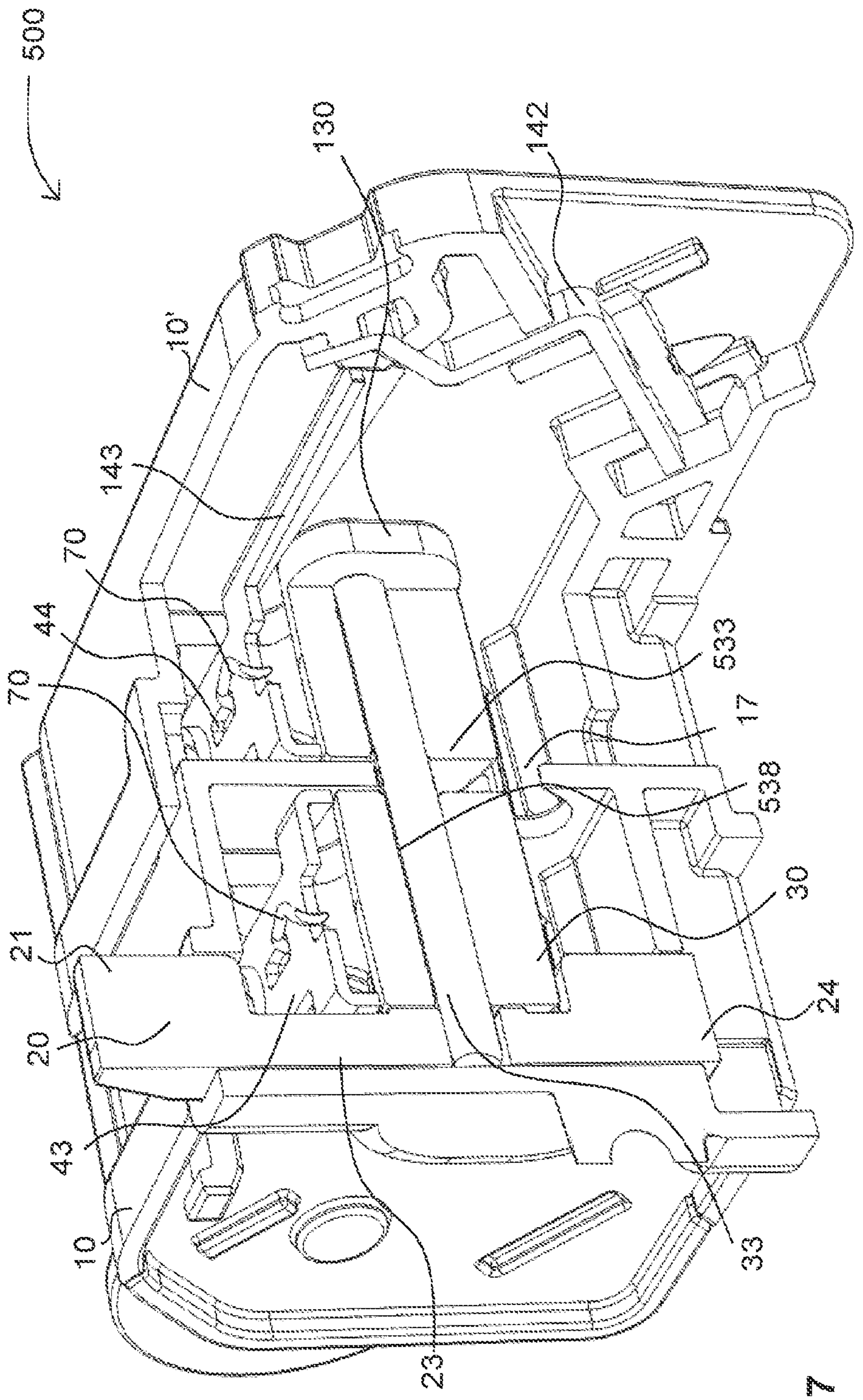
FIG. 7 a partial perspective view of a snap-action switching element according to a fourth embodiment example with coupled contacts.

FIG. 7 shows a partial perspective view of a further snap-action switching element 500 according to a further embodiment example with coupled contacts. This is also designed as a normally closed contact. However, analogous to FIG. 6, it can also be designed as a double normally open contact. In addition to the contacts 41, 42 and 43 from the first embodiment example, of which only a part of the contact arm 43 is shown here, there are corresponding contacts, of which only the contacts 142 and 143 are shown here in FIG. 4. However, it is clearly recognizable that in the embodiment example of the snap-action switching element

500, two identically constructed snap-action switching elements 100 are arranged next to each other, whereby reference is now made in the description here to the differences with regard to the embodiment of FIG. 1 and FIG. 4.

The housing half 10 shown on the left in FIG. 7 is constructed in the same way as the snap-action switching element 100 and has the actuating element 20. The housing half 10 is modified in that it has a housing groove 17 on the side facing away from the actuating element 20. In both snap-action switching elements arranged next to each other, there is only a single receiving opening 538 in which a double connection shaft 533 is inserted on the side facing away from the actuating element 20. In a variation, the double connecting shaft 533 (as in the other embodiments of the connecting shaft 133 or the rocker bearing connecting section in general) can be connected in one piece to the actuating element 20 if, in return, the receiving opening 538 (or the receiving opening 38, etc.) has sufficient play for the horizontal movement required by the pivoting movement of the rocker switch 30.

In all embodiments, a lower housing opening 11' is provided, which has side walls 111' in which the actuating section 20 is guided as a plunger. In this case, the underside 120 of the actuating section or actuating shaft 20 ends in the rest position of the actuating shaft 20 between the side walls 111' of the lower housing opening 11'. Parallel to this, the upper side 110 of the housing 10 is then designed to complement the lower side 110' of the housing 10, which makes it possible to provide a vertically arranged double snap-action switching element by arranging two versions of the snap-action switching elements 100, 200, 400, 500 one above the other.

LIST OF REFERENCE SYMBOLS

- 10 housing
- 10' housing part
- 11 upper housing feed-through
- 11' lower housing opening
- 12 rocker switch bearing
- 13 housing side wall
- 14 connection contact guide wall
- 15 contact support rib
- 16 counter-rib
- 17 housing groove
- 20 actuating shaft
- 21 actuating head
- 22 rocker bearing opening
- 23 upper head section
- 24 lower guided section
- 30 rocker switch
- 31 bearing opening
- 32 horn/web of the rocker switch
- 32' horn/web of the rocker switch
- 33 rocker bearing actuating section
- 34 spring suspension section
- 35 bearing side section
- 36 spring side section
- 37 contact surface
- 38 upper opening
- 41 first conductive contact
- 42 second conductive contact
- 43 bearing-mounted contact arm
- 44 spring receiving opening
- 45 rocker receiving opening
- 51 clamping plate
- 52 clamping screw

61 fixed contact point of the first contact
61 fixed contact point of the first contact
62 bearing groove in second contact
63 contact point of the mounted contact arm
70 tension spring
71 suspension section
100 snap-action switching element
110 upperside of the housing
110' underside of the housing
111' side walls
120 underside of the actuating shaft
130 rocker switch of the double module
133 connecting shaft
138 lower receiving opening
142 second conductive contact of the double module
143 bearing-mounted contact arm of the double module
200 snap-action switching element
300 Y-axis (force or distance)
301 X-axis (movement of the actuating shaft)
310 force acting on the rocker switch (e.g. spring suspension section)
311 force at rest position
312 force at the start of the opening movement of the switching element
313 force at the end of the opening movement of the switching element
314 increasing force when the actuating shaft is pressed down further
320 force acting on the contact point 63 of the mounted contact arm 43
321 positive initial value of the force
322 value of the force is zero
330 distance of the supported contact point 63 from the fixed contact point 61
331 distance of the closed contact (=0).
332 distance of the open contact after switching movement
334 increasing distance as the actuating shaft is pressed down further
340 crossing point (corresponding to the position of the mirror line)
400 snap-action switching element
500 snap-action switching element
533 double connection shaft
538 receiving opening

The invention claimed is:

1. A snap-action switching element with normally closed or normally open contact comprises:
a housing,
a first contact point fixed to the housing,
a second contact point fixed to the housing,
a contact arm having a rest position and a switching position and the contact arm having a first contact arm end and a second contact arm end,
an actuating member guided in the housing,
a rocker switch having a rocker switch axis of rotation extending transversely to a longitudinal axis of the housing and having a first free end and a second free end,
a tension spring,
wherein the actuating member is configured to move the contact arm between the rest position and the switching position,
wherein the rocker switch at the first free end can be rotated about the rocker switch axis of rotation,
wherein the tension spring is hooked onto a spring hook-in section at the second free end of the rocker switch, wherein the actuating member is guided perpendicularly to the longitudinal axis of the housing and is in engagement with the rocker switch between the first free end and the second free end of the rocker switch,
wherein the second contact point provides a contact arm axis of rotation parallel to the rocker switch axis of rotation, against which the first contact arm end is pressed by the tension spring suspended in the contact arm,
wherein the second contact arm end of the contact arm contacting the first contact point in the rest position in the case of the snap action switching element being with normally closed contact or, in the case of the snap-action witching element being with normally open contact, is arranged at a distance from the first contact point in the case of a normally open contact,
wherein the actuating member has a rocker bearing opening which is provided transversely to a direction of movement of the actuating member and into which rocker bearing opening engages a rocker bearing actuating section provided transversely to a main plane of the rocker switch.

2. The snap-action switching element according to claim 1, wherein a length of the tension spring, a distance between the hook-in opening in the contact arm and the contact arm axis of rotation, and a distance between the spring hook-in section and the rocker axis of rotation are predetermined so that the torque acting on the rocker switch is always directed against an actuating direction of the actuating member in the rest position, in the switching position and in positions in between, so that the actuating member moves back into the rest position without being actuated.

3. The snap-action switching element with normally closed contact according to claim 1, wherein the rocker switch comprises at least one driver which, in the rest position, projects from below over the contact arm in such a way that, while the rocker switch is being moved into the switching position and before the switching position is reached, the at least one driver engages with the contact arm from above and pivot it downwards in an actively guided manner if the contact arm does not move between the rest position of the actuating element and the engagement due to the contact point of the contact arm adhering to the first contact point.

4. The snap-action switching element with normally closed contact according to claim 3, in that the driver comprises at least one horn or a bridge.

5. The snap-action switching element according to claim 1, wherein the contact arm, starting from an end having the contact arm axis of rotation, has a rocker switch receiving opening and a separate spring end receiving opening adjoining the receiving opening.

6. The snap-action switching element according to claim 5, wherein the contact arm, viewed in cross-section in the longitudinal direction, has a U-shape reinforcing the contact arm at least in a region of the rocker switch receiving opening and the spring end receiving opening.

7. The snap-action switching element according to claim 1, wherein the rocker switch has a receiving opening into which the rocker bearing actuating portion is inserted, with which the actuating member is in engagement with the rocker switch between the first free end and the second free end of the rocker switch.

8. The snap-action switching element according to claim 7, wherein an upper rest position stop is provided between the rocker bearing actuating portion and the spring hook-in section.

9. The snap-action switching element according to claim 7, wherein, in the case of the snap-action switching element being with normally closed contact, between the rocker rotary axis and the rocker bearing actuating section, a support section is provided for the contact arm, against which an underside of the contact arm leans after the switching position has been exceeded.

10. The snap-action switching element according to claim 7, wherein, in the case of the snap-action switching element being with normally open contact, the first contact point is arranged between the rocker rotary axis and the rocker bearing actuating section, against which a mounted contact point on an underside of the contact arm abuts after the switching position has been exceeded.

11. The snap-action switching element according to claim 7, wherein a side wall of the housing has a housing groove in an area of the receiving opening of the rocker switch in the side wall, in that a further pair of contact points fixed to the housing, a further contact arm, a further rocker switch with receiving opening and a further tension spring are provided in a housing extension, which are each arranged in a direction of the longitudinal axis of the housing parallel to the first contact points fixed to the housing, the first contact arm, the first rocker switch and the first tension spring behind the said side wall, wherein a connecting shaft is inserted into the receiving openings of the first and second rocker switches through the housing groove, wherein the movement of the two rocker switches is synchronized by the connecting shaft.

12. The snap-action switching element according to claim 11, wherein the connecting shaft is integrated integrally into the rocker bearing actuating section or these are arranged one behind the other in the receiving opening.

13. The snap-action switching element according to claim 11, wherein the first and second switching rockers have two transversely extending upper and lower receiving openings, and in that the switching rocker actuating portion is a bolt inserted into the upper or into the lower receiving opening, and in that the connecting shaft is a bolt inserted into the other receiving opening.

14. The snap-action switching element according to claim 13, wherein in that one or both receiving openings of the rocker switch has/have a partition wall in the middle for limiting the movement of the connecting shaft and/or the rocker bearing actuating section.

* * * * *